(12) United States Patent
Tinker et al.

(10) Patent No.: US 9,514,365 B2
(45) Date of Patent: *Dec. 6, 2016

(54) IMAGE SENSOR WITH INTEGRATED REGION OF INTEREST CALCULATION FOR IRIS CAPTURE, AUTOFOCUS, AND GAIN CONTROL

(71) Applicant: Princeton Identity, Inc., Princeton, NJ (US)

(72) Inventors: Michael Tinker, Yardley, NJ (US); David Alan Ackerman, Hopewell, NJ (US); Raymond Kolczynski, Bordentown, NJ (US); James Bergen, Hopewell, NJ (US)

(73) Assignee: Princeton Identity, Inc., Princeton, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/846,090

(22) Filed: Sep. 4, 2015

(65) Prior Publication Data

US 2015/0379325 A1    Dec. 31, 2015

Related U.S. Application Data

(63) Continuation of application No. 12/464,369, filed on May 12, 2009, now Pat. No. 9,131,141.

(60) Provisional application No. 61/052,494, filed on May 12, 2008.

(51) Int. Cl.
*G06K 9/62* (2006.01)
*G06K 9/00* (2006.01)
*G06K 9/32* (2006.01)
*H04N 5/225* (2006.01)
*H04N 5/232* (2006.01)
*H04N 5/235* (2006.01)

(52) U.S. Cl.
CPC .......... *G06K 9/0061* (2013.01); *G06K 9/3241* (2013.01); *H04N 5/2256* (2013.01); *H04N 5/2351* (2013.01); *H04N 5/2354* (2013.01); *H04N 5/23212* (2013.01)

(58) Field of Classification Search
None
See application file for complete search history.

(56) References Cited

U.S. PATENT DOCUMENTS

| 5,291,560 | A | 3/1994 | Daughman |
| 6,714,665 | B1 | 3/2004 | Hanna et al. |
| 6,765,581 | B2 | 7/2004 | Cheng |

(Continued)

*Primary Examiner* — Joshua Joo
(74) *Attorney, Agent, or Firm* — McCarter & English, LLP

(57) ABSTRACT

An integrated circuit has an image sensor to receive at least one image comprising a plurality of pixels from a camera comprising a lens, a buffer communicatively connected to the image sensor for storing values associated with the plurality of pixels, and a comparator communicately connected to the buffer to locate and identify the iris of a subject, in which locating and identifying the iris of the subject is based on a location of each pixel in a brightest pixel set. A method for locating and identifying an iris in an image includes capturing at least one image of an illuminated subject, determining a brightness value for each of the plurality of pixels, determining a location corresponding to each pixel in a brightest pixel set, and identifying the iris in the at least one image based on the location of each pixel in the brightest pixel set.

15 Claims, 6 Drawing Sheets

(56) References Cited

U.S. PATENT DOCUMENTS

| | | |
|---|---|---|
| 7,015,955 B2 | 3/2006 | Funston et al. |
| 7,542,628 B2 | 6/2009 | Lolacono et al. |
| 2002/0080141 A1* | 6/2002 | Imai .................. G06T 15/40 345/519 |
| 2003/0123711 A1* | 7/2003 | Kim .................. G06K 9/00597 382/117 |
| 2004/0236549 A1 | 11/2004 | Dalton |
| 2005/0063582 A1 | 3/2005 | Park et al. |
| 2005/0084179 A1 | 4/2005 | Hanna et al. |
| 2006/0028617 A1 | 2/2006 | Matsumura et al. |
| 2006/0210123 A1* | 9/2006 | Kondo .................. G06K 9/0061 382/117 |
| 2007/0206935 A1 | 9/2007 | Ono |
| 2007/0236567 A1 | 10/2007 | Pillman et al. |
| 2007/0285537 A1 | 12/2007 | Dwinell et al. |
| 2008/0049185 A1 | 2/2008 | Huffman et al. |
| 2008/0219515 A1* | 9/2008 | Namgoong .......... G06K 9/0061 382/117 |
| 2009/0220126 A1 | 9/2009 | Claret-Tournier et al. |

\* cited by examiner

IMAGE SENSOR WITH INTEGRATED REGION OF INTEREST CALCULATION FOR IRIS CAPTURE, AUTOFOCUS, AND GAIN CONTROL

CROSS-REFERENCE TO RELATED APPLICATIONS

This is a continuation of U.S. patent application Ser. No. 12/464,369, filed May 12, 2009, which claims the benefit of U.S. provisional patent application No. 61/052,494 filed May 12, 2008, the disclosures of which are incorporated herein by reference in their entirety.

TECHNICAL FIELD

The present disclosure relates generally to iris recognition systems, and more particularly, to a method for providing coarse segmentation of an iris (capture), autofocus, and automatic gain control in iris recognition circuits.

BACKGROUND

Iris recognition is widely regarded as one of the most reliable biometric identifiers currently available. The accuracy of iris recognition systems is currently on par with fingerprints and, given the correct state of the art, better than facial recognition techniques. An iris pattern is unique to any individual eye: the irises of each eye are different for an individual and even between identical twins.

The majority of commercial iris recognition systems are based on a few fundamental principals. In such systems, an iris of a subject is illuminated with light from controlled and ambient light sources. A camera and the controlled light source are located at some pre-defined standoff distance from the subject. The camera, including a (possibly filtered) lens and a sensor acquire an iris image that is then captured by a computer. The iris image is then segmented (i.e., the iris portion of an image is separated from the rest of the captured image), normalized, and an iris template (commonly referred to as an iris code) is generated. The template is then matched against templates in an existing database of previously enrolled iris templates. A match against the database indicates that the iris associated with the current template is the same iris that was used to create the template that is present in the database. The camera sensor used to capture the iris image of the subject may be either a CCD or CMOS sensor.

An iris recognition system developed by Sarnoff Corporation of Princeton, N.J., known as Iris on the Move™ (IOM), permits moving subjects to be identified at distances up to three meters from the iris recognition equipment. More particularly, the IOM system employs strobed Near Infrared (NIR) illumination to capture iris images. The use of NIR permits the capture of iris features with very high contrast. NIR strobed illumination freezes the motion of the subject and because the subject is illuminated for very small amounts of type (typically about 2.5 milliseconds), high illumination intensities may be employed without posing a safety hazzard to the eyes of the subject. The high illumination intensities produce very bright specularities on an eye of the subject, which in turn may be used to locate an iris of the subject for coarse segmentation (i.e., a rough separation in an image of pixels that correspond to the irises of a subject).

In the past, IOM system implementations required both specialized hardware to control the capture of images and to synchronize illumination and specialized software to locate specularities. The specialized hardware was external to the camera sensor itself, which rendered the IOM system expensive. There exists systems that are less expensive than IOM that rely on visible light cell phone camera technology, however, such systems do not rely on NIR imagery and are considerably less accurate than NIR-based systems.

Accordingly, what would be desirable, but has not yet been provided, is an inexpensive, highly integrated, highly accurate iris recognition system that is adapted to employ specular reflection as an eye-finding technique and uses strobed NIR as a means for imaging irises with very bright light. It is further desirable that such a system employs coarse segmentation of the iris, autofocusing, and automatic gain control.

SUMMARY

One embodiment comprises an integrated circuit has an image sensor to receive at least one image comprising a plurality of pixels from a camera comprising a lens, a buffer communicatively connected to the image sensor for storing values associated with the plurality of pixels, and a comparator communicatively connected to the buffer to locate and identify the iris of a subject, in which locating and identifying the iris of the subject is based on a location of each pixel in a brightest pixel set.

Another embodiment comprises an integrated circuit having an image sensor configured to capture an image of an illuminated subject, scan logic connected to the image sensor, the scan logic configured to scan the image sensor and to send addresses and pixel values to a buffer, a comparator to retrieve addresses and pixel values from the buffer and to determine a set of brightest pixels, region of interest logic configured to receive the set of brightest pixels and locate a region of interest in the image and produce an output indicating the region of interest, and autofocus logic to autofocus the camera based upon the region of interest.

Another embodiment comprises a method for locating and identifying an iris in an image includes capturing at least one image of an illuminated subject, determining a brightness value for each of the plurality of pixels, determining a location corresponding to each pixel in a brightest pixel set, and identifying the iris in the at least one image based on the location of each pixel in the brightest pixel set.

DETAILED DESCRIPTION

Figure 1:
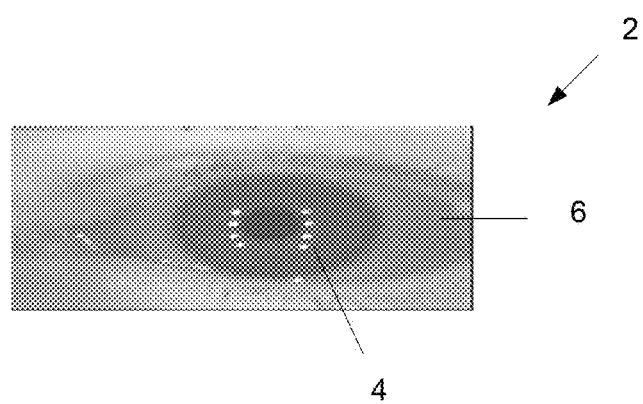
FIG. 1 illustrates an image of an eye showing a pattern of specularities resulting from illumination with an illumination source, according to an embodiment.

FIG. 1 illustrates an image 2 of an eye 6 in which a pattern of bright reflected spots (specularities) 4 results from illumination with an illumination source. In an embodiment, a plurality of NIR illuminators provides short duration (i.e., strobed) high intensity light upon a subject (i.e., a human). According to an embodiment, an iris of the eye is identified and located by obtaining a brightest pixel set in an image of the eye. The brightest pixel set correspond to the specularities provided by the illuminators. A system for capturing an iris image may comprise any number of illuminators. According to an embodiment, eight illuminators may be employed, as illustrated by the 8 specularity spots shown in FIG. 1.

Figure 2:
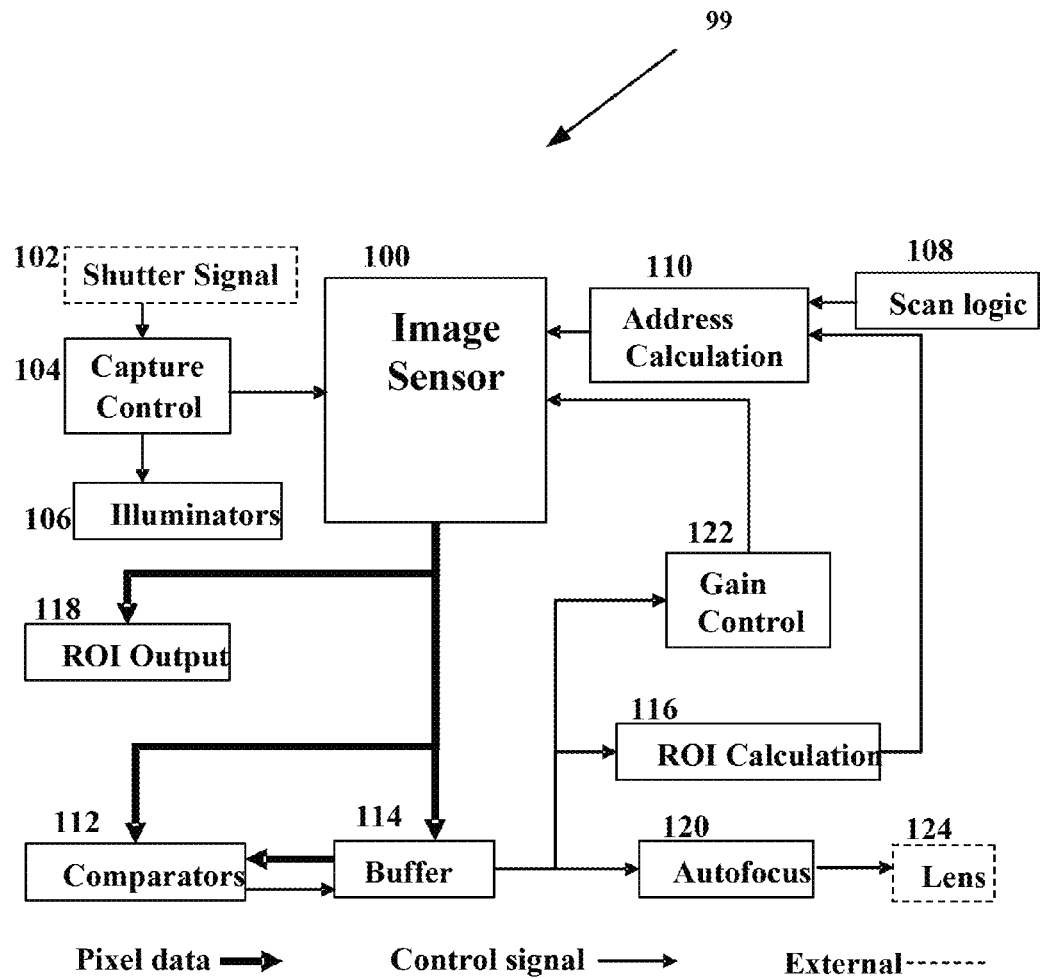
FIG. 2 is a block diagram of an exemplary iris recognition system configured locate and identify an iris in an image, according to an embodiment.

FIG. 2 depicts a block diagram of an exemplary system configured to implement a coarse segmentation of an iris from an image, according to an embodiment. The iris recognition system 99 includes an image sensor 100, which may be a CMOS or CCD sensor of an image capturing system (not shown), e.g., a camera, the image capturing system having a camera shutter providing a camera shutter signal 102. The iris recognition system 99 further includes a capture control logic 104, a plurality of illuminators 106, scan logic 108, address calculation logic 110, at least one comparator 112, one or more buffers 114, region of interest (ROI) calculation logic 116, an ROI output logic 118, autofocus logic 120 which may interact with an external camera lens 124, and automatic gain control logic 122. According to an embodiment, the iris recognition system 99, excluding the camera shutter 102, camera lens 124, and camera body (not shown), may be integrated on a single integrated circuit. According to another embodiment, the illuminators 106 may be separate from (i.e., not integrated on) the integrated circuit. Preferably, the illuminators 106 are configured to strobe light in the near infrared (NIR) with a wavelength of approximately 850 nm.

Figure 3:
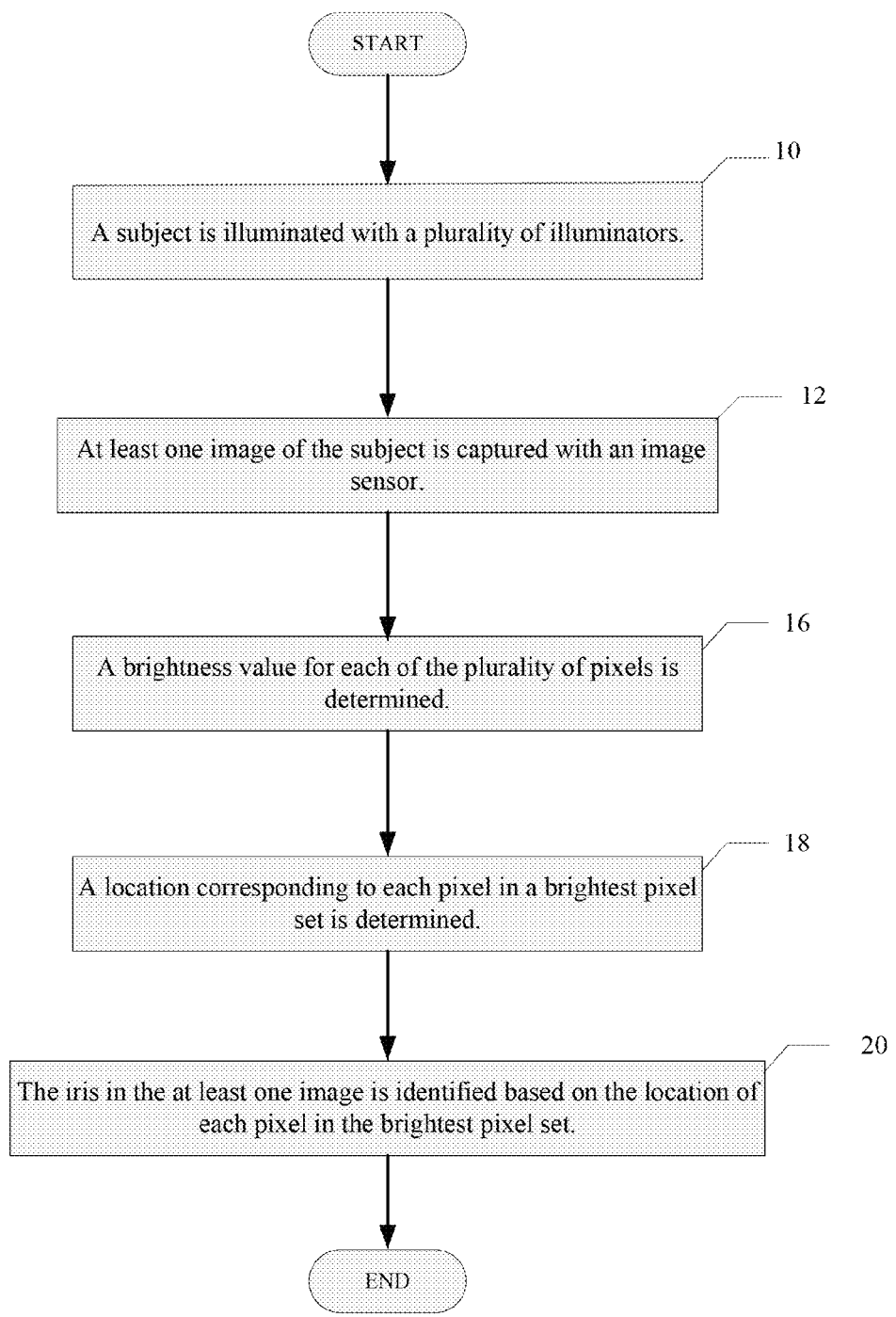
FIG. 3 is a process flow diagram illustrating exemplary steps for locating and identifying an iris, according to an embodiment.

FIG. 3 is a process flow diagram illustrating exemplary steps for locating and identifying an iris (i.e., coarse segmentation), according to an embodiment. Referring now to FIGS. 2 and 3, at Step 10, a subject is illuminated with a plurality of illuminators 106. At Step 12, at least one image of the subject is captured with a camera by the image sensor 100. At Step 16, a brightness value for each of a plurality of pixels in the image sensor 100 is found. At Step 18, locations in the image sensor 100 of corresponding to each pixel in a brightest pixel set are determined as described in detail below. At Step 20, the iris in the at least one image is identified based on the location of each pixel in the brightest pixel set.

Still referring to FIG. 2, the address calculation logic 110 translates linear addresses into appropriate row and column addresses for the image sensor 100. After the image sensor 100 captures an image, the scan logic 108, through the address calculation logic 110, scans all pixels on the image sensor 100. The scan logic 108 may be a simple counter that runs from 0 to [number-of-pixels−1]. As a result of the scan, the addresses and values of a plurality of the brightest pixels having the greatest pixel values are taken from the image sensor 100 and are stored in a buffer 114. The operations of the comparator 112 and the buffer 114 are explained hereinbelow. The brightest pixels are assumed to be the specularities from the illuminators 106 that were strobed during image capture, and as such may be used to locate the iris in the image. Based on the locations of the specularities, the Region of Interest (ROI) logic 116 computes the part of the image that contains the iris. The ROI calculation logic 116 sends the addresses of the pixels containing the iris to the address calculation logic 110 and those pixels are output from the sensor to the ROI output logic 118.

Figure 4:
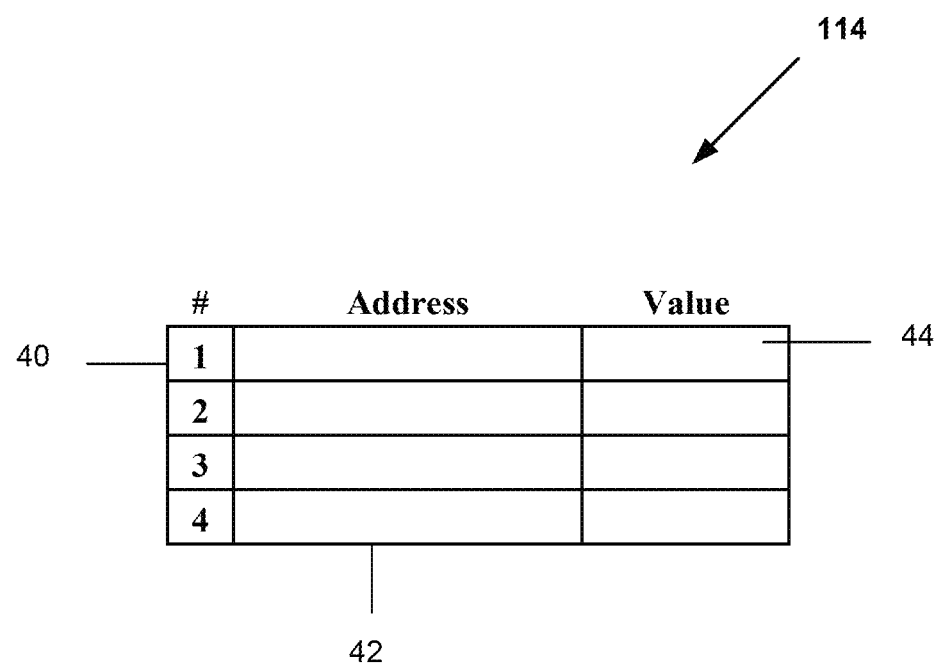
FIG. 4 illustrates an exemplary pixel buffer, according to an embodiment.

According to an embodiment, in order to implement the coarse segmentation (eye-finding) method described above, the pixel buffer 114 and comparator 112 are configured to locate the brightest pixels in a captured image. FIG. 4 illustrates an exemplary pixel buffer 114. In some embodiments, there are four pixel values and their addresses; in practice, there might be more, depending on the number of illuminators 106 associated with the sensor 100. Each entry 40 in the buffer 114 comprises an address 42 of the pixel in the image sensor 100 and the pixel value 44 at that address. As the image is scanned in the image sensor 100, a stored value of a pixel from the image sensor 100 is sent to the comparator 112. The comparator compares the stored value to the smallest value in the buffer 114. If the currrent value is greater than the smallest value currently in a buffer entry 40, then the stored value replaces the buffer entry 40. When the scan is completed, there are buffer entries 40 for each of the (in this case four) brightest pixels, i.e., a buffer entry 40 corresponds to one pixel illuminated by one of the illuminators 106.

Referring again to FIG. 2, simply locating specularities is not sufficient. Indeed, the specularities themselves may lie within the iris. In a preferred embodiment, the iris recognition system 99 locates the entire eye, including the iris. The Region of Interest Logic 116 performs the necessary calculation of the area to be read out and communicates that to the addressing logic 110. The addressing logic 110 reads out only the ROI pixels to the ROI output display logic 118. As a result, the sensor 100 reduces readout bandwidth and presents the iris recognition logic with only those pixels it needs to operate on. According to an embodiment, the ROI logic 116 calculates a standard size image (e.g., 640×480, 100×100, etc.) including the specularities in the buffer entries 40 of FIG. 4.

According to an embodiment, the iris recognition system 99 described above may be provided with logic to more robustly identify the iris by analyzing not only the brightness of the pixels, but also the pattern formed by the specularities. Referring again to FIG. 2, modern autofocus cameras known in the art use a Fourier transform to determine sharpness whereby a camera moves its lens to maximize high-frequency elements in an image. This approach is necessary because any given image contains completely unknown elements. In contrast to such systems, the iris recognition system 99 disclosed herein is configured to employ known elements in any image, i.e., the specularities from the illuminators 106. The specularities exhibited in any image illuminated with the illuminators 106 and captured by the image sensor 100 correspond to the brightest spots in the image. Since the irradiance of any given specularity is relatively constant, the amount of energy (number of photons) impinging on the image sensor 100 from any given specularity will be the same regardless of how many pixels that given specularity is being imaged by. Therefore, the fewer pixels that image a specularity, the brighter those pixels are in the image. When the pixels are brightest, the image of the specularity will be smallest, and the image is in the best focus.

Figure 5:
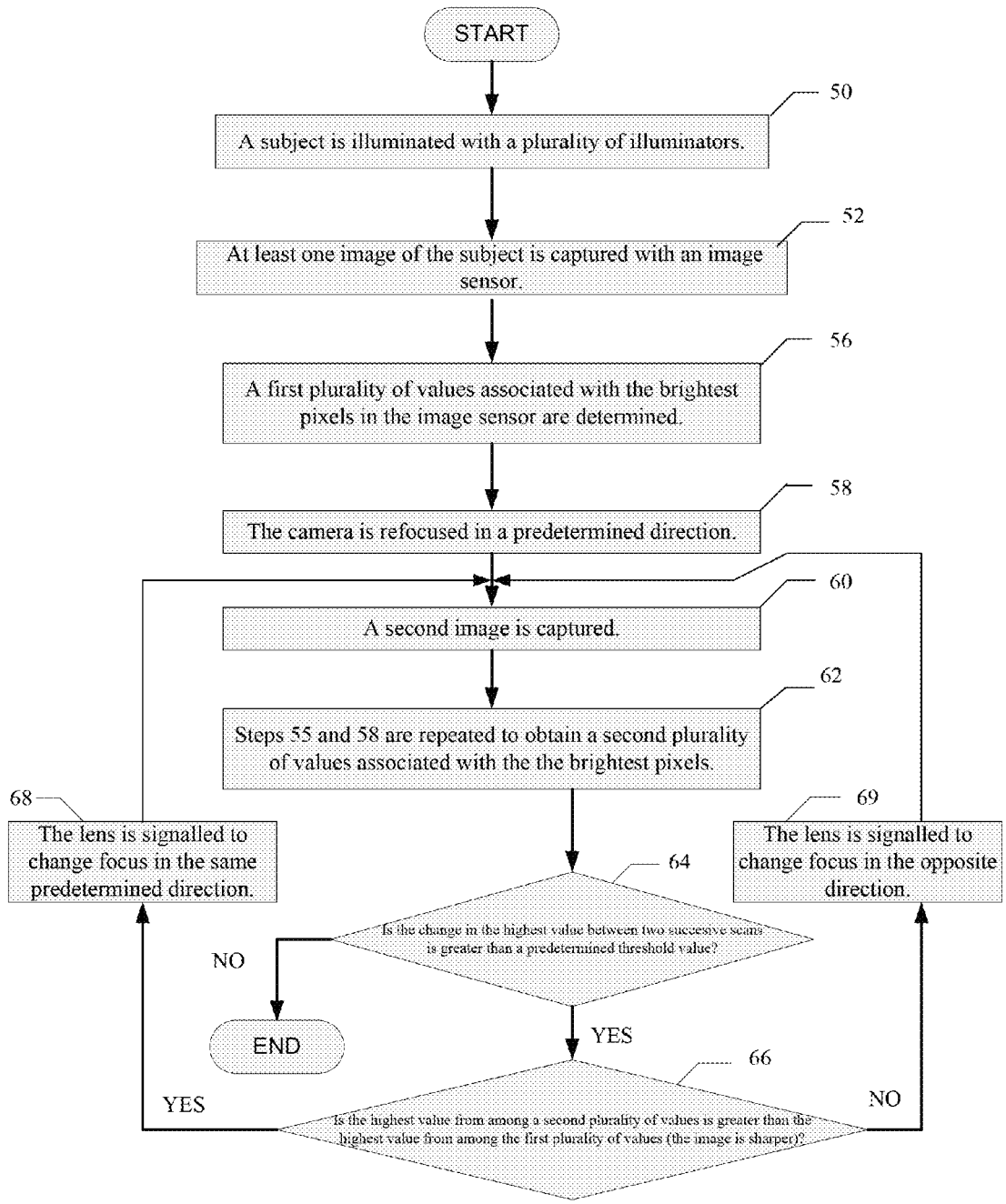
FIG. 5 is a process flow diagram illustrating exemplary steps for autofocusing a camera having a lens and having a focus mechanism associated with an iris recognition system, according to an embodiment.

FIG. 5 is a process flow diagram illustrating exemplary steps for autofocusing a camera having a lens and having a focus mechanism associated with an iris recognition system, according to an embodiment. According to the embodiment disclosed in FIGS. 2 and 5, the autofocusing technique disclosed herein changes the focus of the camera to increase, and preferably maximize, the brightness values of the pixels in the brightest pixel set. At Step 50, a subject is illuminated with the plurality of illuminators 106. At Step 52, at least one image of the subject is captured with a camera using the image sensor 100. At Step 56, a first plurality of values associated with the brightest pixels in the image sensor 100 is determined.

In operation, the autofocus logic 120 stores the value of the brightest pixel in the pixel buffer 114 from the last scan of the image sensor 100 by the scan logic 108. This scan may have been performed in conjunction with the coarse segmentation technique described in FIG. 3. At Step 58, the autofocus logic 120 then signals the lens 124 to refocus the camera in a predetermined direction. At step 60, the capture control logic 104 initiates another image capture, and the scan logic 108 scans the newly captured image. At Step 62, Steps 56 and 58 are repeated to obtain a second plurality of values associated with the the brightest pixels. At Step 64, if the change in the highest value between two successive scans is less than a predetermined threshold value, the image sensor 100 is considered to be in focus. If, after the scan is complete, the highest value of pixels in the buffer 114 is greater than the value stored by the autofocus logic 120, the iris recognition system 99 signals the lens 124 to change focus again in the same direction. If the value is less than the stored value (i.e., the focus has gotten worse), then the iris recognition system 99 signals the lens 124 to change focus in the opposite direction.

More particularly, if, at Step 64, the change in the highest value between two successive scans is greater than the predetermined threshold, then at step 66, it is determined whether the highest value from among the second plurality of values is greater than a highest value from among the first plurality of values (the image is sharper). If so, then at Step 68, the lens is signalled to change focus in the same predetermined direction and Steps 60-64 are repeated. If, at Step 64, the highest value from among a second plurality of values associated with the the brightest pixels is less than the highest value from among the first plurality of values (the image is less focused), then at Step 69, the lens is signalled to change focus in the opposite direction and Steps 60-64 are repeated.

Referring again to FIG. 2, generating an iris code (template) depends on there being discernible features in the iris. If there is insufficient contrast in an original iris image, feature extraction fails and no code is computed. The ISO standard for Iris Image Data (ISO/IEC 19794-6) recommends a minimum of 70 grey levels of separation (out of 256) between the iris and the sclera and 50 grey levels of separation between the iris and the pupil. However, achieving the necessary contrast across the iris may be hampered by conditions such as ambient lighting, camera aperture, eye color, etc. Contrast can be adjusted by adjusting the gain of the image sensor 100 using the gain control logic 122. The ISO standard recommends that greyscale density be adjusted so that specularities in the image are at a saturation level (i.e., 255 for a 256 grey level sensor). Because the iris recognition system 99 disclosed here is already detecting specularity levels, only gain control logic 122 in addition to the existing logic already referenced need be employed.

Figure 6:
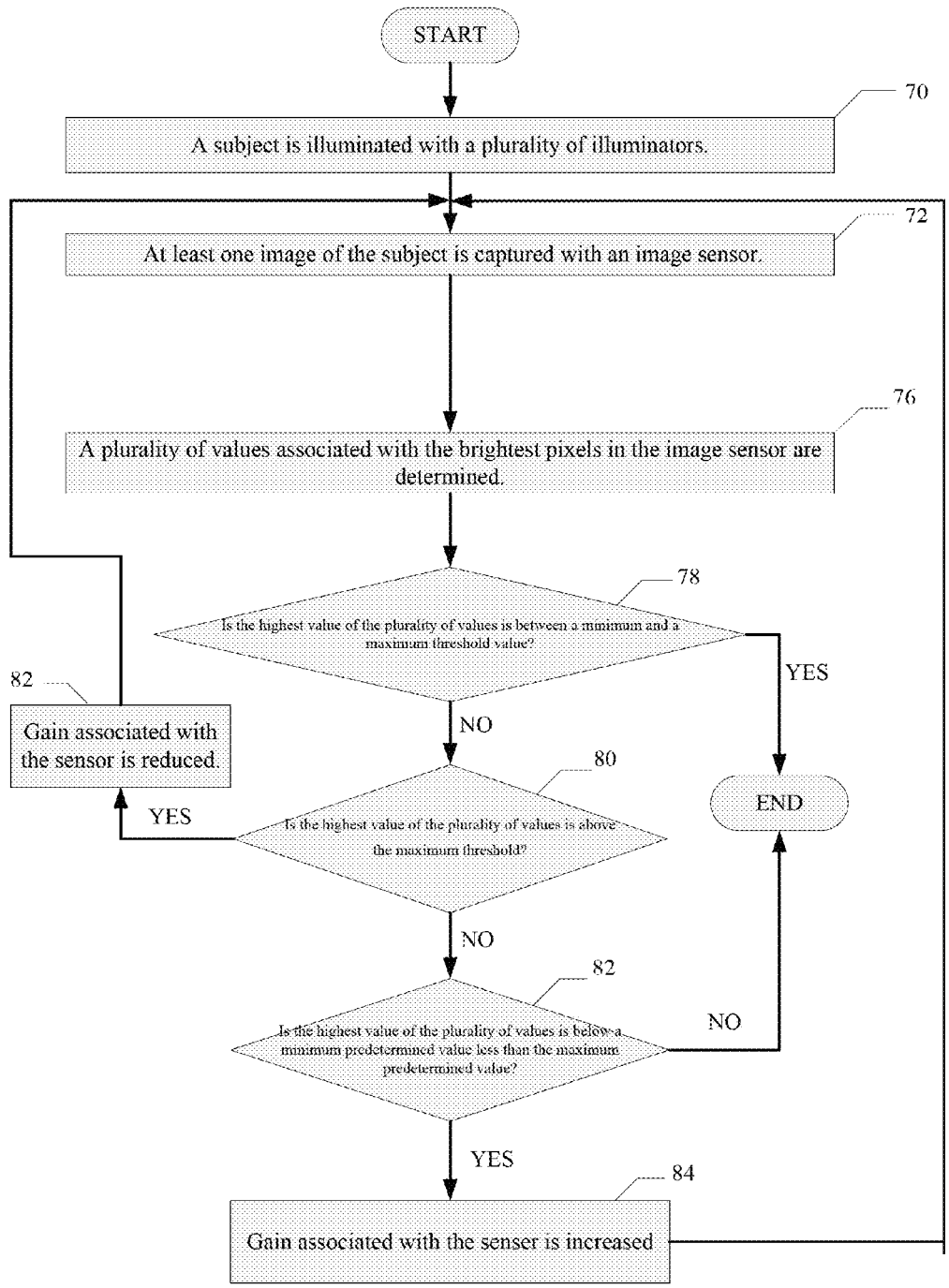
FIG. 6 is a process flow diagram illustrating exemplary steps for providing automatic gain control to an image sensor associated with an iris recognition system, according to an embodiment.

FIG. 6 is a process flow diagram illustrating exemplary steps for providing automatic gain control to an image sensor associated with an iris recognition system, according to an embodiment. Referring now to FIGS. 2 and 6, At Step 70, a subject is illuminated with the pluarality of illuminators 106. At Step 72, at least one image of the subject is captured with a camera using the image sensor 100. The gain control logic 122 examines the highest valued pixel in the buffer 114. At Step 76, a plurality of values associated with the brightest pixels in the image sensor 100 is determined. At Step 78, if the highest value of the plurality of values is between the minimum and maximum threshold values, then the method is terminated, otherwise, at step 80, if the highest value of the plurality of values is above a maximum threshold (e.g., the value of the pixel is 255 (assuming 8-bit pixels)), then at Step 82, gain associated with the image sensor 100 is reduced by the gain control logic 122. At Step 82, Steps 72-82 are repeated until a highest value of the plurality of values is below the maximum threshold (e.g., the brightest pixel is less than 255). If, at Step 84, the highest value of the plurality of values is below a minimum predetermined value less than the maximum predetermined value (e.g., some negative delta from 255), then at Step 86, the gain associated with the senser is increased output by the gain control logic 122 is increased and Steps 72-84 are repeated until a highest value of the plurality of values is above the minimum threshold.

According to an embodiment, because the iris recognition system 99 is designed specifically for iris recognition, a visible blocking filter (not shown) may be added directly to the sensor 100, obviating the need for an additional filter in the camera system. Many current visible light imagers are sensitive well into the infrared, a fact exploited by camera manufacturers who add a "night" imaging capability to their cameras. However, for embodiments that are used to image in the infrared, the image sensor 100 may be optimized for the 700-900 nm range. In such circumstances, raising the quantum efficiency of the image sensor 100 increases the signal-to-noise ratio, providing better quality iris images.

Embodiments here have distinct advantage over prior art iris recognition system. More particularly, system size is reduced system size because the sensor 100 and logic may be implemented with a single integrated circuit. Bandwidth is reduced because only the segmented iris (ROI) is output from the iris recognition system 99, avoiding the need to output an entire image. Typically, the number of pixels that need to be output will be reduced by one to two orders of magnitude, e.g., from $1000^2$ (sensor pixels) to $100^2$ (output pixels). External logic is reduced because the output image has already been correctly segmented to contain the iris. There is reduced external logic for autofocus and automatic gain control functions. Because autofocus and gain control are on the image sensor 100, the image sensor 100 can capture multiple images and use them for gain and autofocus control, without ever actually outputting an image. This circuitry replaces the memory and logic that would otherwise be external to the device, thus reducing further the amount of data that has to be output and ensuring that the ultimate output will be a segmented iris image, in good focus, and with good contrast. Since the system captures and output high quality iris images with a minimum of external circuitry, the cost and complexity of incorporating iris biometric capture into mass-market consumer electronics devices is reduced.

It is to be understood that the exemplary embodiments are merely illustrative and that many variations of the above-described embodiments may be devised by one skilled in the art without departing from the scope of the claims. It is therefore intended that all such variations be included within the scope of the following claims and their equivalents.

What is claimed is:

1. An integrated circuit, comprising:
an image sensor configured to receive at least one image comprising a plurality of pixels from a camera comprising a lens;
a buffer communicatively connected to the image sensor for storing values associated with the plurality of pixels; and
a comparator circuit portion of the integrated circuit communicately connected to the buffer configured to locate and identify the iris of a subject from the stored values;
wherein locating and identifying the iris of the subject is based on a location of each pixel in a brightest pixel set determined by the comparator circuit portion and a pattern formed by the brightest pixel set.

2. The integrated circuit of claim 1, further comprising autofocus logic circuitry in the integrated circuit configured to adjust focus of the lens based upon a location of each pixel in the brightest pixel set.

3. The integrated circuit of claim 2, wherein the autofocus logic circuitry is further configured to repeatedly refocus the camera until a change in a highest pixel value among two successive scans is less than a predetermined threshold value.

4. The integrated circuit of claim 1, further comprising gain control logic circuitry in the integrated circuit configured to adjust a gain of the image sensor based upon the location of each pixel in the brightest pixel set.

5. The integrated circuit of claim 1, further comprising scan logic circuitry in the integrated circuit configured to scan the image sensor and send pixel values and addresses to the comparator circuit portion.

6. The integrated circuit of claim 1, wherein the image sensor further comprises one of a Charge Coupled Device (CCD) and a Complementary Metal Oxide Semiconductor (CMOS) image sensor.

7. The integrated circuit of claim 1, wherein the brightest pixel set is associated with one or more specularities generated in the at least one image when illuminated by a plurality of illuminators.

8. An integrated circuit, comprising:
an image sensor in the integrated circuit configured to capture an image of an illuminated subject;
scan logic circuitry in the integrated circuit connected to the image sensor, the scan logic circuitry configured to take pixel values of each pixel identified by an address in the image sensor and to send the addresses and the pixel values to a buffer;
a comparator circuit in the integrated circuit to retrieve the addresses and the pixel values from the buffer and to determine a set of brightest pixels and a pattern formed by the set of brightest pixels as a region of interest; and
autofocus logic circuitry to autofocus a camera based upon the region of interest.

9. The integrated circuit of claim 8, further comprising gain control logic circuitry in the integrated circuit configured to adjust a gain on the image sensor.

10. The integrated circuit of claim 8, wherein the image sensor comprises one of a Charge Coupled Device (CCD) and a Complementary Metal Oxide Semiconductor (CMOS) image sensor.

11. The integrated circuit of claim 8, wherein the comparator circuit is configured to locate a region of interest based upon the pattern formed by the brightest pixel set.

12. A method for locating and identifying an iris in an image, the method comprising:
capturing at least one image of an illuminated subject with an image sensor, wherein the image comprises a plurality of pixels;
determining a brightness value for each of the plurality of pixels;
identifying specularities in the iris from the brightness values for each of the plurality of pixels, the specularities defining a brightest pixel set;
determining a location corresponding to each pixel in the brightest pixel set; and
identifying the iris in the at least one image based on the location of each pixel in the brightest pixel set and a pattern formed by the brightest pixel set.

13. The method of claim 12, further comprising:
storing addresses and brightness of each of the plurality of pixels in a buffer communicatively connected to the image sensor;
sending a current stored value of a pixel to a comparator communicatively connected to the buffer;
comparing with the comparator circuit the stored value to a current smallest brightness value in the buffer, wherein if the current stored value is greater than the current smallest brightness value, then replacing the current smallest brightness value with the current stored value in the buffer; and
repeating the sending and comparing for each of the pixels in the at least one image.

14. The method of claim 13, further comprising:
prior to storing addresses, translating linear addresses into row and column addresses for the image sensor;
scanning all pixels on the image sensor;
selecting from among the scanned pixels the addresses and brightness values corresponding to the brightest pixel set; and
storing the selected addresses and brightness values in the buffer.

15. The method of claim 13, further comprising sending the addresses of the pixels in the brightest pixel set from the buffer to the image sensor for output to a display.

* * * * *